(12) United States Patent  (10) Patent No.: US 8,566,654 B2
Cinarkaya et al.  (45) Date of Patent: Oct. 22, 2013

(54) DEBUGGING SITE ERRORS BY AN ADMIN AS A GUEST USER IN A MULTI-TENANT DATABASE ENVIRONMENT

(75) Inventors: Bulent Cinarkaya, San Jose, CA (US); Irandi Upeka Bulumulla, San Francisco, CA (US); Ryan Guest, Stockton, CA (US)

(73) Assignee: salesforce.com, inc., San Francisco, CA (US)

( * ) Notice: Subject to any disclaimer, the term of this patent is extended or adjusted under 35 U.S.C. 154(b) by 601 days.

(21) Appl. No.: 12/856,125

(22) Filed: Aug. 13, 2010

(65) Prior Publication Data

US 2012/0042218 A1  Feb. 16, 2012

(51) Int. Cl.
  *G06F 11/00* (2006.01)
(52) U.S. Cl.
  USPC .......................................................... 714/57
(58) Field of Classification Search
  None
  See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |

(Continued)

*Primary Examiner* — Michael Maskulinski
(74) *Attorney, Agent, or Firm* — Ingrassia Fisher & Lorenz, P.C.

(57) ABSTRACT

An approach for debugging site errors in a multi-tenant database system is disclosed. An example method can include receiving a request from a site administrator to access an enhanced error message and determining if the site administrator is approved for viewing the enhanced error message by evaluating exceptions associated with the enhanced error message, the request, and the site administrator. The example method further includes modifying a detailed error message related to the request for generating the enhanced error message, and providing the enhanced error message to the site administrator based on the approval determination.

15 Claims, 8 Drawing Sheets

(56) References Cited

U.S. PATENT DOCUMENTS

| | | |
|---|---|---|
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,533,420 B2 * | 5/2009 | Battagin et al. ............... 726/26 |
| 7,620,655 B2 | 11/2009 | Larsson et al. |
| 7,698,160 B2 | 4/2010 | Beaven et al. |
| 7,734,962 B2 * | 6/2010 | Sabin et al. ............... 714/48 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,117,664 B2 * | 2/2012 | Johnson et al. ............... 726/27 |
| 8,132,261 B1 * | 3/2012 | Simpson et al. ............... 726/27 |
| 8,275,836 B2 | 9/2012 | Beaven et al. |
| 8,407,353 B2 * | 3/2013 | Moses et al. ............... 709/229 |
| 8,468,577 B1 * | 6/2013 | Pooley et al. ............... 726/1 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

* cited by examiner

| Default Web Address | http://japan01.ap1-blitz02.soma.force.com/ [Preview as Admin] |
|---|---|
| Secure Web Address | http://japan01.ap1-blitz02.soma.force.com/ [Preview as Admin] |
| Custom Web Address | http://www.japan.jp [Preview as Admin] |

DEBUGGING SITE ERRORS BY AN ADMIN AS A GUEST USER IN A MULTI-TENANT DATABASE ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to an admin as a guest user for debugging purposes in a multi-tenant database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

Unfortunately, conventional approaches might display generic error pages to users instead of showing a detailed error message. Such an approach may be suitable for guest users, but this approach can be a problem when a website is being developed or has an error, because when a generic error page is displayed, website administrators may not be able to determine the real issue.

BRIEF SUMMARY

An approach for debugging site errors in a multi-tenant database system is disclosed. An example method includes receiving a request from a site administrator to access an enhanced error message and determining if the site administrator is approved for viewing the enhanced error message by evaluating exceptions associated with the enhanced error message, the request, and the site administrator. The example method further includes modifying a detailed error message related to the request for generating the enhanced error message and providing the enhanced error message to the site administrator based on the approval determination. In accordance with embodiments, there are provided mechanisms and methods for debugging site errors in a multi-tenant database system. These mechanisms and methods for debugging site errors in a multi-tenant database system can include receiving a request from a site administrator to access an enhanced error message, and determining if the site administrator is approved for viewing the enhanced error message. Particular embodiments can include modifying a detailed error message related to the request for generating the enhanced error message, and providing the enhanced error message to the site administrator based on the approval determination.

In particular embodiments and by way of example, a method for debugging site errors in a multi-tenant database system can include receiving a request from a site administrator to access an enhanced error message, determining if the site administrator is approved for viewing the enhanced error message by evaluating exceptions associated with the enhanced error message, the request, and the site administrator, modifying a detailed error message related to the request for generating the enhanced error message, and providing the enhanced error message to the site administrator based on the approval determination.

While the present invention is described with reference to various examples in which techniques for debugging site errors in a multi-tenant database system are implemented in a system having an application server providing a front end for an on-demand database service capable of supporting multiple tenants. The present invention is not limited to multi-tenant databases or deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Approaches are provided for debugging site errors by an admin as a guest user in a multi-tenant database environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for debugging site errors by an admin as a guest user in a multi-tenant database environment will be described with reference to example embodiments.

System Overview

Figure 1:
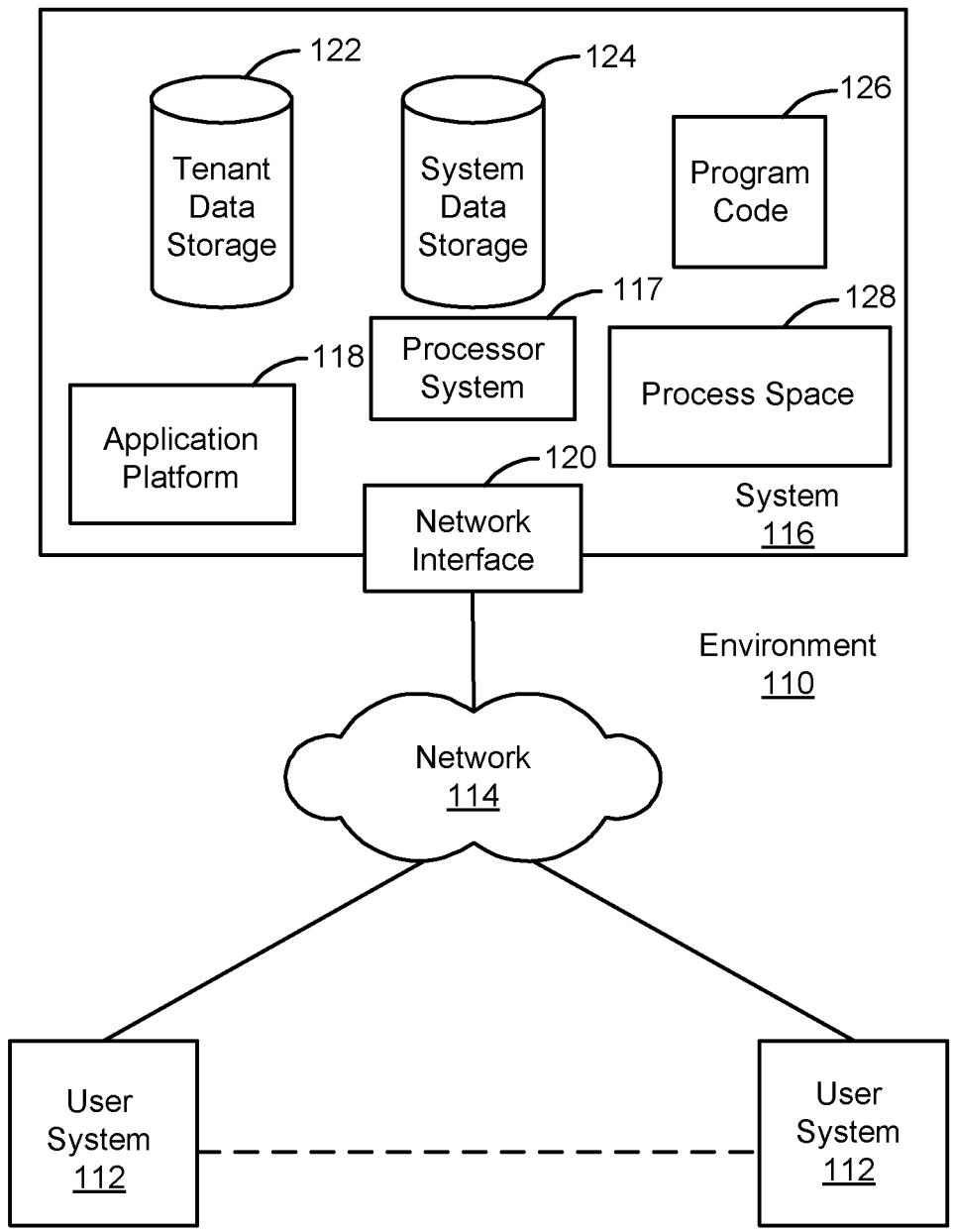
FIG. 1 illustrates a block diagram of an example of an environment wherein an on-demand database service might be used.

FIG. 1 illustrates a block diagram of an environment 110 wherein an on-demand database service might be used. Environment 110 may include user systems 112, network 114, system 116, processor system 117, application platform 118, network interface 120, tenant data storage 122, system data storage 124, program code 126, and process space 128. In other embodiments, environment 110 may not have all of the components listed and/or may have other elements instead of, or in addition to, those listed above.

Environment 110 is an environment in which an on-demand database service exists. User system 112 may be any machine or system that is used by a user to access a database user system. For example, any of user systems 112 can be a handheld computing device, a mobile phone, a laptop computer, a work station, and/or a network of computing devices. As illustrated in FIG. 1 (and in more detail in FIG. 2) user systems 112 might interact via a network 114 with an on-demand database service, which is system 116.

An on-demand database service, such as system 116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 116" and "system 116" will be used interchangeably herein. A database image may include one or more database objects. A relational database management system (RDMS) or the equivalent may execute storage and retrieval of information against the database object(s). Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 16 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 1, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide webpages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
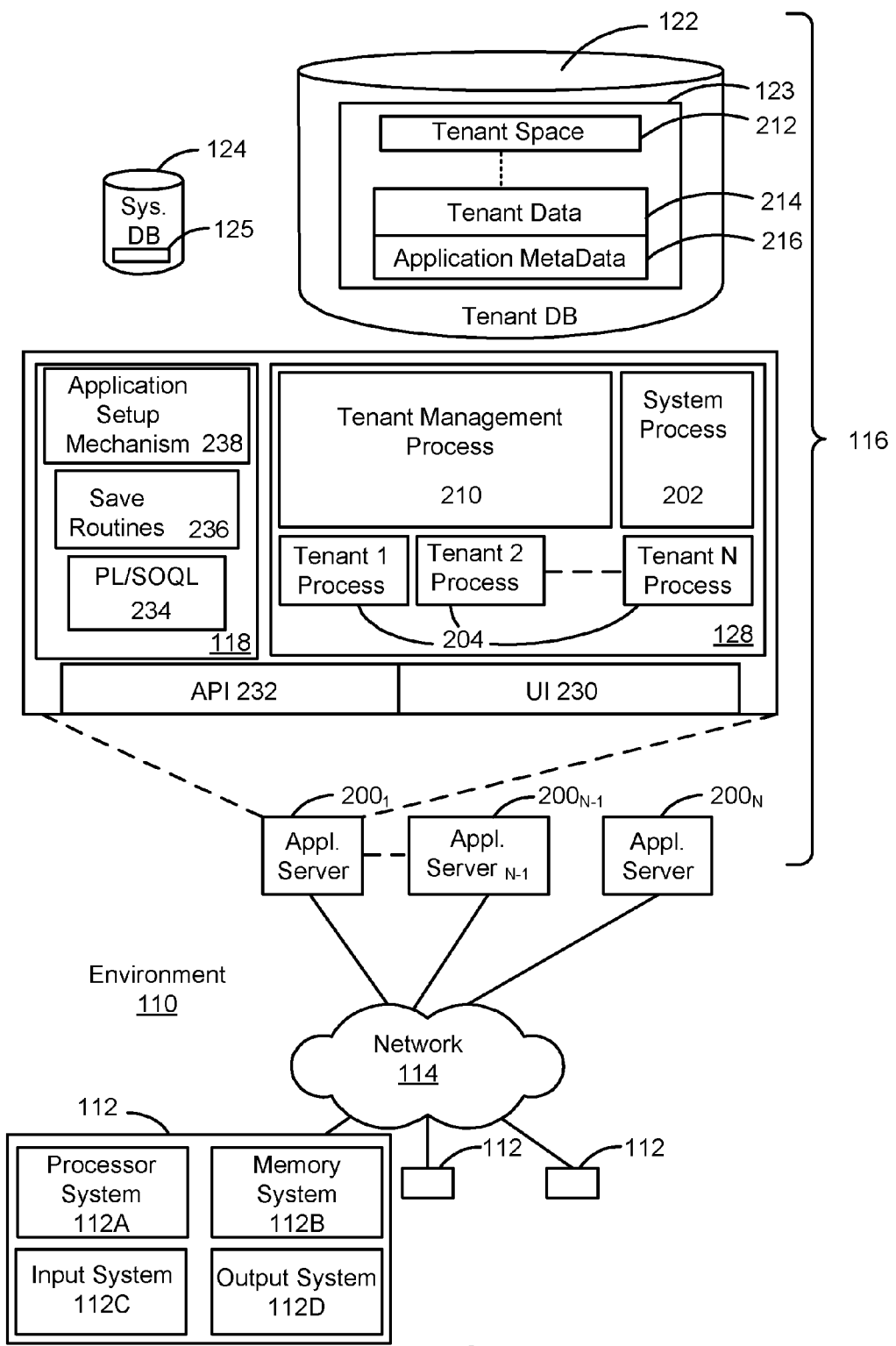
FIG. 2 illustrates a block diagram of an embodiment of elements of FIG. 1 and various possible interconnections between these elements.

FIG. 2 also illustrates environment 110. However, in FIG. 2 elements of system 116 and various interconnections in an embodiment are further illustrated. FIG. 2 shows that user system 112 may include processor system 112A, memory system 112B, input system 112C, and output system 112D. FIG. 2 shows network 114 and system 116. FIG. 2 also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 1. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks. As shown by FIG. 2, system 116 may include a network interface 120 (of FIG. 1) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. Invocations to applications may be detected by one or more system processes, which manages retrieving application metadata 216 for the subscriber making the invocation and executing the metadata as an application in a virtual machine.

Each application server 200 may be communicably coupled to database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multitenant, wherein system 116 handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Administrator as Guest User

In the following examples, one or more implementations are illustrated for debugging site errors. Clearly, in alternate implementations, the illustrated processes and process steps may be combined into fewer steps, divided into more steps, and/or performed in a different sequence.

In one example, a method for debugging site errors in a multi-tenant database system, can include: receiving a request from a site administrator to access an enhanced error message; determining if the site administrator is approved for viewing the enhanced error message by evaluating exceptions associated with the enhanced error message, the request, and the site administrator; modifying a detailed error message related to the request for generating the enhanced error message; and providing the enhanced error message to the site administrator based on the approval determination.

For example, the request may be received through a user interface, and in particular can include a mode ("preview as administrator") designed to allow access to additional error message details. Such a mode is useful because it is not desirable that other users see such detailed error information. Rather, "generic" error pages or messages (e.g., Page Not Found, Bandwidth Exceeded, Generic Exception, in Maintenance, under Construction, Unauthorized, etc.) are supplied for typical users. However, administrators may not be able to utilize such generic error messages to actually debugging site errors. As such, particular embodiments can provide the preview as administrator mode to allow access to more detailed error information.

Information about site errors can include substantial detailed or "raw" error information. However, if the system 116 provides all of this detailed error information to the site administrator upon entry into the preview as administrator mode, several problems can occur as a result. First, there may be security issues that arise because the administrator may not be cleared for access to the entirety of this information. Second, the information may be so detailed that may actually not be useful at all to the site administrator. Third, the information in the detailed error message may be in a format that is not readable or easily understood by a site administrator that does not have special training for deciphering such a document. To address these issues, system 116 can modify the detailed error message to create an enhanced error message for the site administrator. Thus, the "enhanced" error message contains a level of information that is greater than a default or "generic" error message utilized in conventional approaches, but somewhat less than or otherwise modified from a possible "detailed" error message as described above.

In determining what information from a detailed error message is modified to create the enhanced error message that is provided to the site administrator, various factors can be considered. For example, "exceptions" corresponding to various errors or aspects can be parsed in the detailed error message to determine what is acceptable to be seen by the site administrator. To accomplish this, a security level of that site administrator can be considered. For example, only errors related to that actual site, and excluding information related to another site, can be allowed for the enhanced error message. Other exceptions that may be parsed in the detailed error message may be at a level of detail outside the scope of a typical site-level concern. That is, the information in the enhanced error message may be substantially useful information to that particular site administrator. In addition, modifications from the detailed error message to the enhanced error message can be performed simply to improve readability or understandability as to the error information itself.

Figure 3:
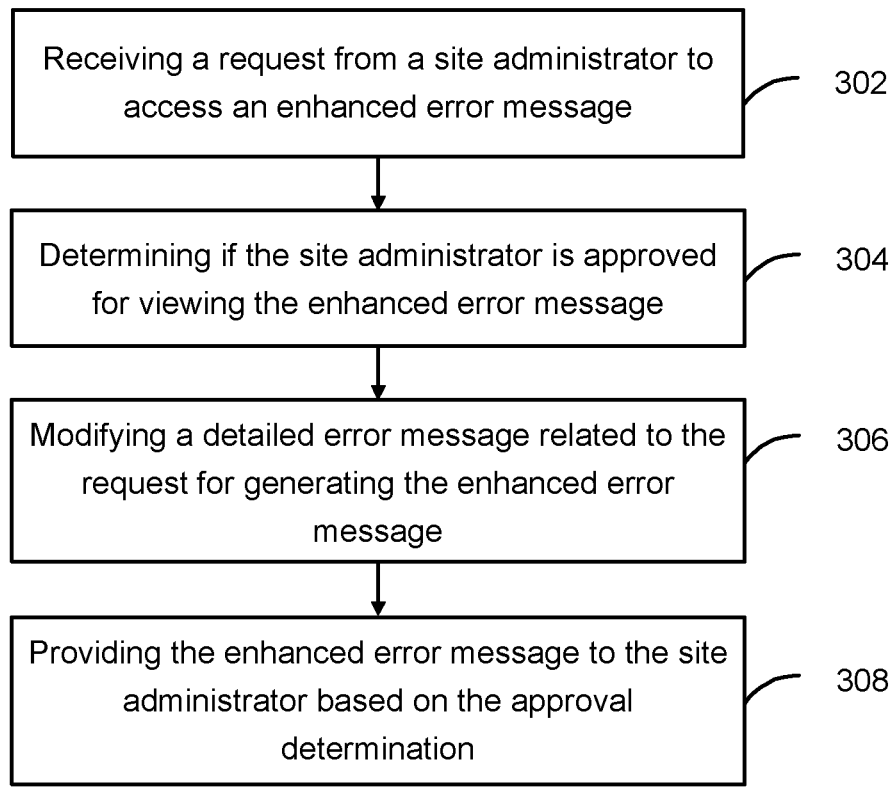
FIG. 3 illustrates an example flow diagram for a method for debugging site errors in a multi-tenant database system.

Referring now to FIG. 3, shown is an example flow diagram for debugging site errors in a multi-tenant database system. This particular example method may be initiated, as shown at block 302, by receiving a request (e.g., via a user interface at a multi-tenant database system) to access an enhanced error message, from a site administrator. For example, such a request can be received via the user clicking a "preview as administrator" link on a user interface. As discussed above, an enhanced error message may be any error message that provides additional details, more information, etc., for debugging a site error, as compared to a more standard or "generic" error message that intentionally hides certain details from a user. At block 304, the system determines if the site administrator is approved for viewing the enhanced error message. This may be done by evaluating access rights and designated exceptions associated with the enhanced error message, the request, and/or the site administrator. Of course, any suitable form of approving access rights (e.g., digital certificates, encryption keys, etc.) can be utilized in particular embodiments.

At block 306, the system may modify a detailed error message related to the request for generating the enhanced error message. As discussed above, the "detailed error message" may include, e.g., substantial raw or otherwise cryptic information related to the site error in question. In one implementation, the system modifies the detailed error message in order to make the error message more readable, understandable, and/or useful to the site administrator. For example, the detailed error message (e.g., generated or controlled by system 116) may be modified to form an "enhanced error message," e.g., by removing certain extraneous error information, re-organizing the information for more clarity in the presentation, or in any other suitable way, in order to facilitate the site administrator being able to ascertain the actual error that occurred. In some cases, there may be certain information in the detailed error message that a particular site administrator is not authorized to see, even when in a preview mode. In these cases, the unauthorized information can be removed from the detailed error message to create the enhanced error message that is authorized to be viewed by a particular site administrator. At block 308, the system provides the enhanced error message to the site administrator based on the approval determination. In this fashion, a user or administrator can access critical error information from the enhanced error message, such as for a site or tenant in a multi-tenant database system.

Figure 4:
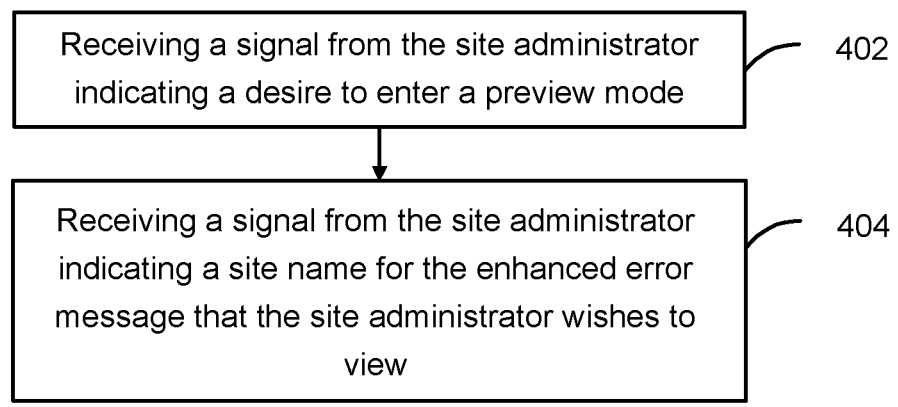
FIG. 4 illustrates an example flow diagram to receive a request for debugging site errors in a multi-tenant database system.

Referring now to FIG. 4, shown is another example flow diagram to receive a request for debugging site errors in a multi-tenant database system. At block 402, the multi-tenant database system may receive a signal from the site administrator indicating a desire to enter a preview (as administrator) mode. Once the system has entered into such a preview mode, in one implementation, as illustrated at block 404, the system receives an additional signal from the site administrator indicating a site name for the enhanced error message that the site administrator wishes to view. For example, a preview mode may be any suitable mode whereby an administrator can access an error message via a user interface. Thus, the preview mode may be a predetermined mode for such message access, as opposed to a normal operating mode. Also, the site name may be indicated at block 404 because such a preview mode may be applicable across a plurality of tenant locations or sites, such as where by system 116 supports a plurality of user systems 112. As such, the administrator can essentially log in from any site and request an error message for a different site, so long as that administrator has the appropriate permissions.

Figure 5:
FIG. 5 illustrates an example screenshot to display error messages for debugging site errors in a multi-tenant database system.
Figure 5:
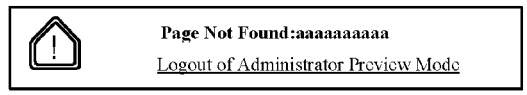

Referring now to FIG. 5, shown is an example screenshot of error messages 500 being displayed for debugging site errors in a multi-tenant database system, such as the multi-tenant database system 116 described above. This particular example shows the "Page Not Found" generic error page. Other example "generic" error messages shown on a website can include Bandwidth Exceeded, Generic Exception, In Maintenance, Under Construction, or Unauthorized. In contrast to these generic error messages, the enhanced error messages provided herein are formatted messages that provide necessary debugging/evaluation information to the website administrators.

A preview as administrator mode can be implemented using any suitable function, tool, application, code, add-on, etc., to a website, such as a special cookie that may be configured on a website (e.g., SITEID), which indicates that these errors should be displayed. In one implementation, by previewing a page as an administrator (e.g., viewing the website details page inside an application, such as a web browser), links can be added to each website. When a website administrator clicks on one of these website URLs, a request is made to an appropriate "servlet" that validates the administrator's credentials, redirects the administrator's web browser to the preview website, and, e.g., provides the administrator with a "cookie." For example, such a cookie may be a random number that is generated and put into a cache memory (e.g., key: random number, value: site id). The cookie may be allowed to expire a predetermined time later (e.g., in two hours) for security reasons, such as if the site administrator leaves his workstation or user interface. This approach allows the site administrators to debug the website at once, or the administrator may have to login to the preview as administrator mode again at another time. The servlet can also let the administrators log out of the current mode. Also, a rule can be set on a CDN (Content Delivery Network) provider (e.g., Akamai) to not cache requests that have this cookie.

In order to display an enhanced error message on a customer error page, HTML and/or Javascript code can be inserted into the customer (site) error page. This code can be used to generate, support, format, or otherwise accommodate the appropriate error message for creating the enhanced error message. However, in some implementations, to avoid the complexity of inserting code into the customer error page, administrators may add a special component on their page (e.g., <site:PreviewAsAdmin>). This component includes the appropriate script/code to display the error message in the appropriate "enhanced" format. In addition, such a component may contain various styling, and also provide mechanisms to allow the administrator to logout. The component and/or inserted code may include any suitable logic to parse any error that happens on a website into a nicely formatted, or otherwise enhanced, error message (e.g., relative to the generic error messages discussed above).

Figure 6:
FIG. 6 illustrates an example screenshot of preview as admin options for debugging site errors in a multi-tenant database system.

Referring now to FIG. 6, shown is an example screenshot of preview-as-admin option for debugging site errors in a multi-tenant database system 600. In one implementation, system 116 can allow a website administrator to configure a website into a specific mode (e.g., a preview, or preview as administrator, mode) that displays errors generated on the website. In particular embodiments, website administrators can utilize the preview mode from any predetermined site configuration supported by system 116. Example site configurations utilize website URLs (Universal Resource Locator), such as default web address (e.g., site.force.com), secure web address (e.g., https://site.secure.force.com), and custom web address (e.g., www.site.com). In this fashion, a preview mode for enhanced error message receipt can be accessed via any supported type of site configuration. The preview as administrator functionality essentially acts the same in all supported website configurations by providing the same type of enhanced error message relative to a standard or generic error message to that particular website, as discussed above.

Figure 7:
FIG. 7 illustrates another example screenshot of preview as admin options for debugging site errors in a multi-tenant database system.

Referring now to FIG. 7, shown is another example screenshot of preview-as-admin option for debugging site errors in a multi-tenant database system 700. For example, a new link may be included on the website detail page "[Preview as Admin]." Clicking on a "Debug" button may set some cookies for the website, and allow the user (e.g., a site administrator) to view the website in a preview mode. During this preview mode, a user may be able to see enhanced, or otherwise appropriately modified, error messages, instead of the standard/generic website error messages. In this fashion, the site administrator can access the enhanced error messages that are not otherwise made available to users at the site.

Figure 8:
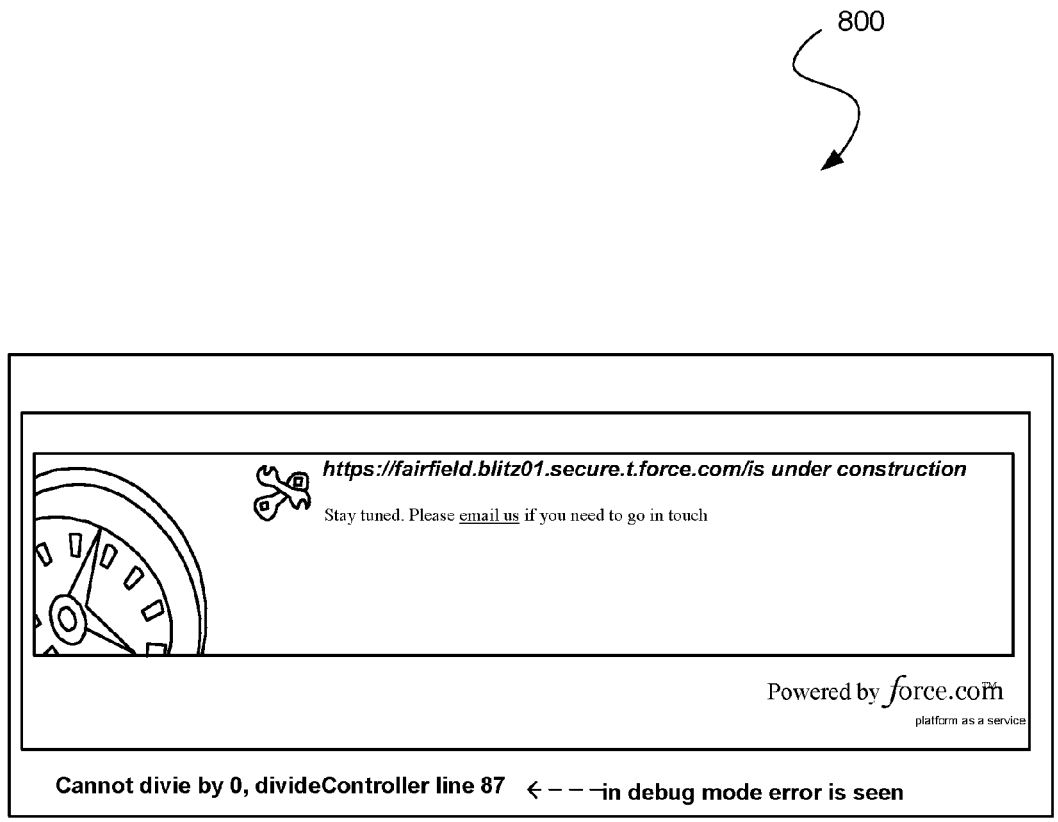
FIG. 8 illustrates an example screenshot to figure out apex errors for debugging site errors in a multi-tenant database system.

Referring now to FIG. 8, shown is an example screenshot 800 used to determine Apex errors for debugging site errors in a multi-tenant database system. The preview as administrator mode may be configured (e.g., to utilize a site:PreviewAsAdmin tag containing a apex:message tag), such as to show validation type errors in a visualforce website page. By default, this tag may be placed on all of the error exception pages. As such, when an exception happens, the error may be shown at the bottom of the page (e.g., Cannot divide by 0, divide controller line 87") by using this tag when in the preview as administrator mode. Further, if the user created custom error page does not include the tag, then the user may not see this particular error in the preview as administrator mode. Accordingly, users may include this tag on their exception pages to facilitate the preview as administrator mode.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for debugging site errors in a multi-tenant database system, the method comprising:
    providing an option to access an error preview mode on a first site of the multi-tenant database system;
    receiving a request from a site administrator to enter the preview mode;
    determining if the site administrator is approved for viewing an enhanced error message related to a second site by evaluating exceptions associated with the enhanced error message, the request, and the site administrator;
    modifying a detailed error message related to the second site of the multi-tenant database system based on an authorization of the administrator to produce an enhanced error message; and
    providing the enhanced error message to the site administrator based on the approval determination.

2. The method of claim 1, wherein the receiving the request comprises:
    receiving a signal from the site administrator indicating a desire to enter the preview mode; and
    receiving a signal from the site administrator indicating a site name for the enhanced error message that the site administrator wishes to view.

3. The method of claim 1, further comprising providing one or more of a predetermined number of site error messages prior to receiving the request to access the enhanced error message.

4. The method of claim 1, wherein the exceptions that are evaluated comprise security exceptions and form exceptions.

5. The method of claim 1, wherein the enhanced error messages may be blocked from customers of each site in the multi-tenant database system.

6. A non-transitory computer-readable storage medium having one or more instructions thereon for debugging site errors in a multi-tenant database system, the instructions when executed by one or more processors causing the one or more processors to carry out:
    providing an option to access an error preview mode on a first site of the multi-tenant database system;
    receiving a request from a site administrator to enter the preview mode;
    determining if the site administrator is approved for viewing an enhanced error message related to a second site by evaluating exceptions associated with the enhanced error message, the request, and the site administrator;
    modifying a detailed error message related to the second site of the multi-tenant database system based on an authorization of the administrator to produce an enhanced error message; and
    providing the enhanced error message to the site administrator based on the approval determination.

7. The non-transitory computer-readable storage medium of claim 6, wherein receiving the request comprises:
    receiving a signal from the site administrator indicating a desire to enter the preview mode; and
    receiving a signal from the site administrator indicating a site name for the enhanced error message that the site administrator wishes to view.

8. The non-transitory computer-readable storage medium of claim 6, wherein the instructions when executed further carry out:
    providing one or more of a predetermined number of site error messages prior to receiving the request to access the enhanced error message.

9. The non-transitory computer-readable storage medium of claim 6, wherein the exceptions that are evaluated comprise security exceptions and form exceptions.

10. The non-transitory computer-readable storage medium of claim 6, wherein the enhanced error messages may be blocked from customers of each site in the multi-tenant database system.

11. An apparatus for debugging site errors in a multi-tenant database, the apparatus comprising:
    a processor; and
    one or more stored sequences of instructions which, when executed by the processor, cause the processor to carry out:
        providing an option to access an error preview mode on a first site of the multi-tenant database system;

receiving a request from a site administrator to enter the preview mode;

determining if the site administrator is approved for viewing an enhanced error message related to a second site by evaluating exceptions associated with the enhanced error message, the request, and the site administrator;

modifying a detailed error message related to the second site of the multi-tenant database system based on an authorization of the administrator to produce an enhanced error message; and providing the enhanced error message to the site administrator based on the approval determination.

12. The apparatus of claim 11, wherein the receiving the request comprises:

receiving a signal from the site administrator indicating a desire to enter the preview mode;
and
receiving a signal from the site administrator indicating a site name for the enhanced error message that the site administrator wishes to view.

13. The apparatus of claim 11, wherein the instructions when executed further carry out:

providing one or more of a predetermined number of site error messages prior to receiving the request to access the enhanced error message.

14. The apparatus of claim 11, wherein the exceptions that are evaluated comprise security exceptions and form exceptions.

15. The apparatus of claim 11, wherein the enhanced error messages may be blocked from customers of each site in the multi-tenant database system.

* * * * *